Patented Mar. 10, 1942

2,275,623

UNITED STATES PATENT OFFICE 2,275,623

MEDICINAL PREPARATION

Edwin L. Gustus, Chicago, Ill., assignor to Wilson & Co., Inc., a corporation of Delaware No Drawing. Application July 1, 1940, Serial No. 343,437

17 Claims. (Cl. 167—65)

This invention relates to an improved medicinal preparation containing bile pigments, and particularly bilirubin, and which is suitable, for example, for the treatment of arthritis and for evaluating liver function, and to the method of making such preparations.

Heretofore, in the therapeutic treatment of arthritis and for other purposes, bile pigments have been administered intravenously to induce an artificial jaundice with resulting analgesic and remedial effects. The bile pigment bilirubin, for example, has been used for this purpose. In accordance with the prior art practice, the bile pigment, such as bilirubin, was administered in solution form, the solution being produced by dissolving the bilirubin in an aqueous solution of sodium carbonate, sodium hydroxide, or the carbonate or hydroxide of the other alkali metals, or in an aqueous solution of ammonia. In such solutions a large excess of the alkali, over and above that necessary merely to neutralize the carboxyl groups of the bilirubin, was required to dissolve the bilirubin, hence these preparations were strongly alkaline, some having a pH of 10 and even higher. These strongly alkaline solutions of bilirubin, administered intravenously in accordance with prior art methods, are objectionable because of their tendency to produce an alkalosis. In addition, it has been found that these solutions of bilirubin, when administered intravenously, tend to produce thrombi in the veins.

In accordance with the present invention, I have prepared novel salts of the bile pigments as well as solutions thereof which may be administered intravenously but which do not produce, and exhibit no tendency to produce, an alkalosis in the system, or thrombi in the veins. Moreover, the solutions of the novel salts of the bile pigments in accordance with the present invention are stable and may be shipped or stored for prolonged periods of time, say for about one year and even longer, without separating or otherwise undergoing deterioration.

In carrying out the present invention, a bile pigment is caused to react with a non-toxic, polyamino-acid compound in the presence of a suitable liquid which is a solvent for the amino compound as well as for the reaction product. The reaction may be carried out at room temperature, or if desired, at slightly higher temperatures, say, in the order of about 85° F. to 100° F. and even higher. The reactants as well as the reaction medium are preferably maintained free from $CO_2$ and $O_2$ throughout the reaction as well as during the subsequent treatment and packaging of the novel salt solution in accordance with my invention as hereinafter more fully described.

In the preferred practice in accordance with my present invention, I cause the bile pigment bilirubin to react with a non-toxic, diaminomonocarboxylic acid compound, such as d-arginine, in the presence of water free from $CO_2$ and $O_2$. An atmosphere of nitrogen or other suitable inert gas may be maintained during the process. In actual practice, the d-arginine is first dissolved in water and the bilirubin introduced therein and caused to react with the d-arginine to form the bilirubin salt of the arginine. This salt is soluble in water and hence there results an arginine bilirubinate which may be used in that form for the heretofore described uses, or for other uses, or may be packaged for storage and/or shipment. In general, it may be stated that sufficient quantities of arginine or other polyamino compound may be used in the solution thereof to react with the desired proportion of bilirubin or other bile pigment to form the polyamino salt of the bile pigment.

Other polyamino compounds, such as d-lysine and l-histidine, for example, may be used as hereinbefore set forth to form the corresponding salts of bilirubin or of the other bile pigments.

The solutions of the polyamino salts of bilirubin prepared in accordance with my invention have a pH below 10 and usually in the order of about 9.6 to 9.7. These solutions of bilirubin and other bile pigments hydrolyze readily on reduction of the pH to 9.4 or lower with the formation of bilirubin (or other bile pigment employed) and the corresponding amino acid. In the case of arginine, lysine and histidine, the amino acid is a normal protein hydrolytic product to be found in the blood stream under normal conditions in varying proportions. Such hydrolysis takes place on intravenous injection of the solution of the present invention.

The novel medicinal preparations in accordance with my invention and the methods of making them will be readily apparent from the following detailed description of illustrative examples of my invention. It will be understood, of course, that the specific details of the examples set forth herein are not to be regarded as limitations on the scope of the products or of the processes except in so far as included in the accompanying claims.

*Example 1*

About 14.8 gms. of d-arginine were dissolved in about 400 cc. of water free from $CO_2$ and $O_2$ and the solution was maintained in an atmosphere of nitrogen to avoid effects of oxygen and carbon dioxide. About 3 grams of bilirubin were placed into a suitable amber-colored bottle and the air therein was displaced by nitrogen. About 250 cc. of the arginine solution prepared and maintained as above described were then introduced into the bottle. The bottle was then stoppered and rotated for about 16 hours at which time the reaction was completed.

The contents of the bottle were now centrifuged under nitrogen to remove the undissolved bilirubin and the solution of bilirubin in aqueous arginine was filtered under nitrogen. The filtered solution was now ampouled under nitrogen and the sealed ampouls were heated to about 80° C. for about one hour. On analysis of the product, it was found to contain about 13.8 mgs. of bilirubin per cc. of solution.

*Example 2*

Into a liter-size Pyrex bottle in which the air was displaced by nitrogen there were introduced about 35 gms. of d-arginine, 11 gms. of bilirubin and about 930 cc. of distilled water free from $CO_2$ and $O_2$ and saturated with nitrogen. The mixture was agitated for about 5 days at which time the reaction was complete. The contents of the bottle were now centifuged under nitrogen to remove the excess of bilirubin and the bilirubin solution was now twice filtered under nitrogen through Berkefeld candles and ampouled under nitrogen. The ampouls were now heated to about 80° C. for about one hour. After cooling a sample was analyzed and showed about 10.3 mgs. per cc. of solution.

*Example 3*

Into a one liter Pyrex bottle there were placed about 16.67 gms. of d-arginine, about 6 gms. of bilirubin and about 443 cc. of distilled water which had previously been boiled and saturated with nitrogen. The air in the bottle was then displaced by nitrogen and the bottle sealed with a well-boiled rubber stopper and adhesive tape. The bottle was placed in a shaking machine and the contents agitated for about 3 days, then placed in a hot water bath having a temperature of about 70° C.–75° C. for about 3 hours with occasional shaking of the contents, and the bottle was then again placed in a shaking machine and the contents agitated at room temperature for an additional three days.

The contents of the bottle were now centrifuged under nitrogen to remove the undissolved bilirubin and the solution was filtered under nitrogen through a Berkefeld candle. The filtered solution was ampouled under nitrogen and the ampouls heated to about 80° C. for about one hour. On cooling a sample of the solution was analyzed and showed about 9.1 mgs. of bilirubin per cc. of solution.

The preparation of solutions of the other bile pigments are similarly prepared. Also, in each case, to produce the corresponding solutions of salts of bilirubin or other bile pigment with lysine, histidine or other polyamino-monocarboxylic acid, equimolecular proportions of the amino acids are used. It is apparent that other polyamino-monocarboxylic acids may be employed, the arginine, lysine and histidine, and, particularly, d-arginine being preferred, because of their normal presence in the body fluids as protein decomposition products. If desired, the salts themselves may be separated by removal of the water or other solvent, suitably in vacuo.

I claim:

1. A stable medicinal preparation comprising a solution of a non-toxic basic amino acid salt of a bile pigment.

2. A stable medicinal preparation comprising a solution of a diamino-monocarboxylic acid salt of a bile pigment.

3. A stable medicinal preparation comprising a solution of a non-toxic basic amino acid salt of bilirubin.

4. A stable medicinal preparation comprising a solution of a diamino-monocarboxylic acid salt of bilirubin.

5. A stable medicinal preparation comprising an aqueous solution of a diamino-monocarboxylic acid salt of a bile pigment.

6. A stable medicinal preparation comprising an aqueous solution of a diamino-monocarboxylic acid salt of bilirubin.

7. A stable medicinal preparation comprising a solution of an arginine salt of bilirubin.

8. A stable medicinal preparation comprising an aqueous solution of an arginine salt of bilirubin.

9. A stable medicinal preparation comprising an aqueous solution of a lysine salt of bilirubin.

10. A stable medicinal preparation comprising an aqueous solution of an histidine salt of bilirubin.

11. A water-soluble diamino-monocarboxylic acid salt of a bile pigment.

12. A water-soluble arginine salt of bilirubin.

13. The method of forming a salt of a bile pigment which comprises dissolving a bile pigment in an aqueous solution of a diamino-monocarboxylic acid compound.

14. The method of forming an arginine salt of bilirubin which comprises dissolving bilirubin in an aqueous solution of arginine.

15. The method of forming an arginine salt of bilirubin which comprises dissolving arginine in water free from $CO_2$ and $O_2$ and dissolving the bilirubin in the arginine solution.

16. The method of forming an arginine salt of bilirubin which comprises dissolving arginine in water free from $CO_2$ and $O_2$ and reacting bilirubin with said solution in an atmosphere of nitrogen.

17. The method of forming a salt of a bile pigment which comprises dissolving a bile pigment in an aqueous solution of a basic amino acid.

EDWIN L. GUSTUS